United States Patent
Bugaud

(10) Patent No.: US 7,054,525 B1
(45) Date of Patent: May 30, 2006

(54) DEVICE FOR TUNING A BRAGG GRATING BY MEANS OF COMPRESSION USING A PIEZOELECTRIC ACTUATOR

(75) Inventor: Michel Bugaud, Argenteuil (FR)

(73) Assignee: Commissariat A L'Energie Atomique, Paris (FR)

( * ) Notice: Subject to any disclaimer, the term of this patent is extended or adjusted under 35 U.S.C. 154(b) by 0 days.

(21) Appl. No.: 10/529,201

(22) PCT Filed: Sep. 26, 2003

(86) PCT No.: PCT/FR03/50069

§ 371 (c)(1),
(2), (4) Date: Mar. 25, 2005

(87) PCT Pub. No.: WO2004/029696

PCT Pub. Date: Apr. 8, 2004

(30) Foreign Application Priority Data

Sep. 30, 2002 (FR) .................... 02 12061

(51) Int. Cl.
*G02B 6/34* (2006.01)

(52) U.S. Cl. ...................................... 385/37

(58) Field of Classification Search ............. 385/37

See application file for complete search history.

(56) References Cited

U.S. PATENT DOCUMENTS

| 5,469,520 | A | 11/1995 | Morey et al. |
| 5,889,901 | A | 3/1999 | Anderson et al. |
| 5,999,671 | A | * 12/1999 | Jin et al. ............... 385/37 |
| 6,792,009 | B1 | * 9/2004 | Putnam et al. ............ 372/6 |
| 2002/0154860 | A1 | * 10/2002 | Fernald et al. ........... 385/37 |
| 2002/0172446 | A1 | * 11/2002 | Fernald et al. ........... 385/12 |
| 2004/0237648 | A1 | * 12/2004 | Jones et al. ........... 73/514.26 |

FOREIGN PATENT DOCUMENTS

| EP | 0 933 662 | 8/1999 |
| WO | 00/37969 | 6/2000 |
| WO | 02/18985 | 3/2002 |

* cited by examiner

*Primary Examiner*—Sung Pak
(74) *Attorney, Agent, or Firm*—Oblon, Spivak, McClelland, Maier & Neustadt, P.C.

(57) ABSTRACT

A device for tuning a Bragg grating, by compression by a piezoelectric actuator. The device is particularly applicable to optical telecommunications and for example includes a mechanism to compress an optical fiber portion, containing a Bragg grating, and a mechanism to prevent buckling of the portion, a tube crossed by the portion, and a guide to guide this portion in the tube. The compression mechanism includes a curved deformable component and a piezoelectric actuator that is positioned between the component and the tube, and that extends when it is energized and thereby deforms the component, the latter then compressing the portion.

12 Claims, 3 Drawing Sheets

Figure 1:
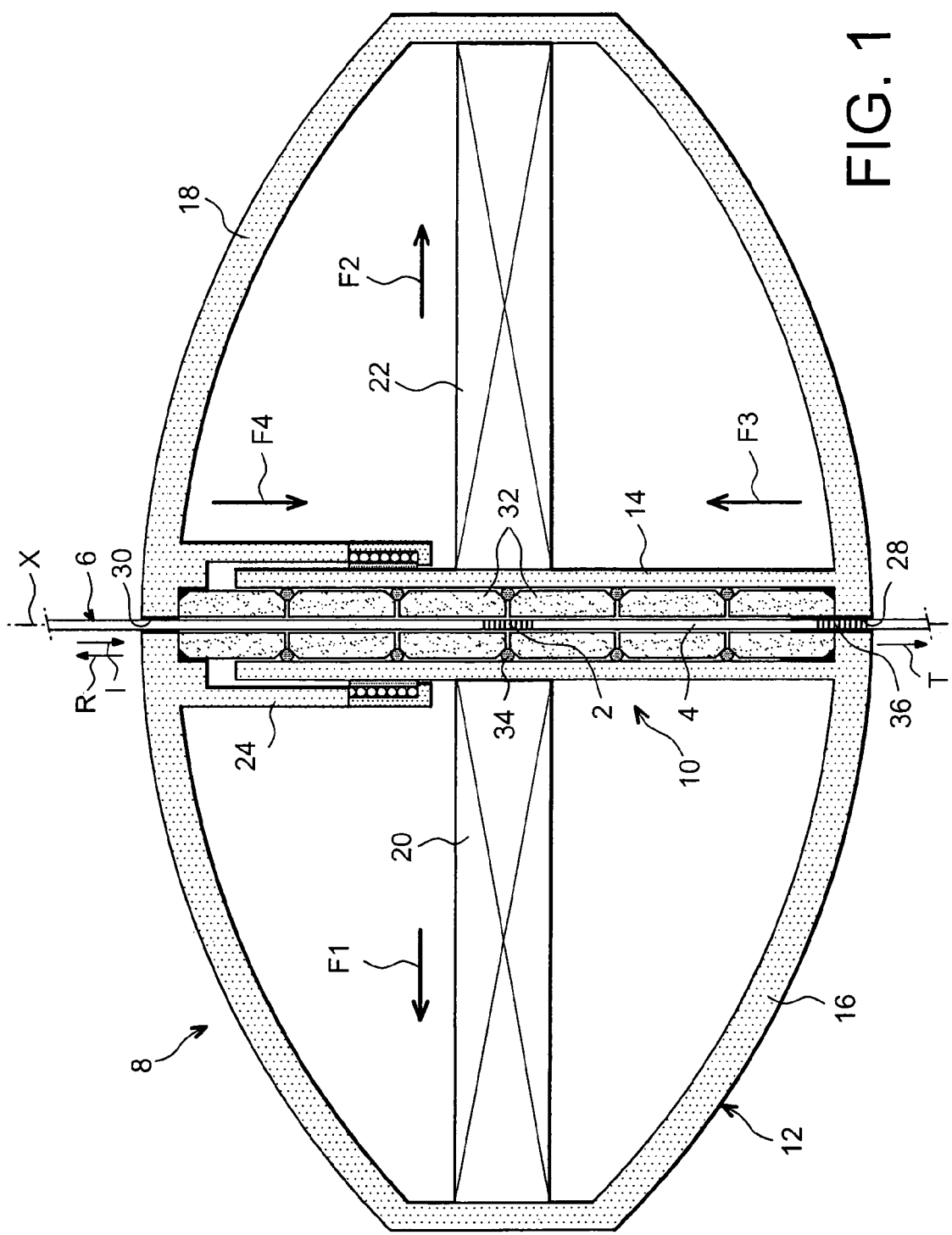

DEVICE FOR TUNING A BRAGG GRATING BY MEANS OF COMPRESSION USING A PIEZOELECTRIC ACTUATOR

TECHNICAL FIELD

The present invention relates to a device for tuning a Bragg grating by compressing the latter.

It is particularly applicable to optical telecommunications, and more specifically, to those which implement DWDM or Dense Wavelength Division Multiplexing.

With the invention, for example, it is possible to form filters, routers, or add-drop devices according to the wavelengths of incident light signals.

STATE OF THE PRIOR ART

It is known how to form a Bragg grating in an optical fiber and to use this grating as a wavelength tunable component.

To tune this grating, it is known how to longitudinally deform the optical fiber in which it is found; so as to change the pitch of the grating and therefore the wavelength response of the latter.

Devices for tuning a Bragg grating formed in an optical fiber by compression of the latter along its longitudinal axis, while preventing buckling of the fiber, are already known.

On this matter, reference will be made to the following documents:

[1] U.S. Pat. No. 5,469,520 "Compression-tuned fiber grating"

[2] WO 00/37969 "Compression-tuned Bragg grating and laser".

DISCUSSION OF THE INVENTION

The object of the present invention is a device for tuning a Bragg grating which may be made very compact.

This device includes a piezoelectric actuator in order to compress the optical fiber, in which the grating is formed, and means for preventing buckling of the thereby compressed fiber.

Preferably, the device further comprises means for controlling compression of the fiber and position-locking means.

The relative simplicity and the compactness of the device, object of the invention, guarantee good integrability and a low manufacturing cost.

Moreover, the compactness of the device gives it low mechanical inertia and therefore a short response time.

Specifically, the object of the invention is a device for tuning a reflector component formed in a portion of an optical waveguide including first and second ends, this optical waveguide being intended for propagating a light, the reflector component being capable of reflecting this light at a reflection wavelength, this device comprising means for compressing the portion of the optical waveguide and therefore the reflector component so as to change the reflection wavelength, and prevention means, for preventing buckling of the optical waveguide portion when the latter is compressed, this device being characterized in that the prevention means comprise a tube with first and second ends, this tube being crossed by the optical waveguide portion, and means for guiding this portion in the tube, and the compression means comprise a curved deformable component, with first and second sides, the first respective ends of the tube and of the optical waveguide portion being attached to the first side, the second end of the tube being spaced apart from the second side and the second end of the optical waveguide portion being attached to this second side, and a piezoelectric actuator positioned in a space between the curved deformable component and the tube and attached to this component and to this tube, this actuator being capable of extending when it is energized and then deforming the component, the latter being then capable of compressing the optical waveguide portion.

Preferably, the reflector component is a Bragg grating.

Further, the optical waveguide is preferably an optical fiber.

According to a preferred embodiment of the device object of the invention, the compression means have an axis of symmetry which is formed by the axis of the optical waveguide portion.

According to a first particular embodiment of the device, object of the invention, the guiding means comprise rings which extend one after the other in the tube, are spaced apart from one another by elastic components, preferably elastic toric spacers, and crossed by the optical waveguide portion, this optical waveguide portion being capable of freely sliding in these rings.

These elastic components preferably are in honeycombed polytetrafluoroethylene.

According to a second particular embodiment of the device, object of the invention, the guiding means comprise stiff washers which are placed one after the other in the tube, along the optical waveguide portion, and crossed by this optical waveguide portion, and elastic components which extend one after the other in the tube, alternate with the stiff washers and are integral with these stiff washers.

Preferably, the elastic components form a unique block of elastic material which confines the optical waveguide portion.

According to a preferred embodiment, the device, object of the invention, further comprises means for controlling the piezoelectric actuator in a closed loop configuration.

These control means may comprise measuring means comprising the Bragg grating or a variable capacitor with two plates which are integral with the tube and the deformable component, respectively.

The device, object of the invention, may further comprise means for blocking the deformable component.

Preferably, these blocking means comprise a component which is made out of a shape memory alloy and capable of tightening the tube.

SHORT DESCRIPTION OF THE DRAWINGS

Figure 2:
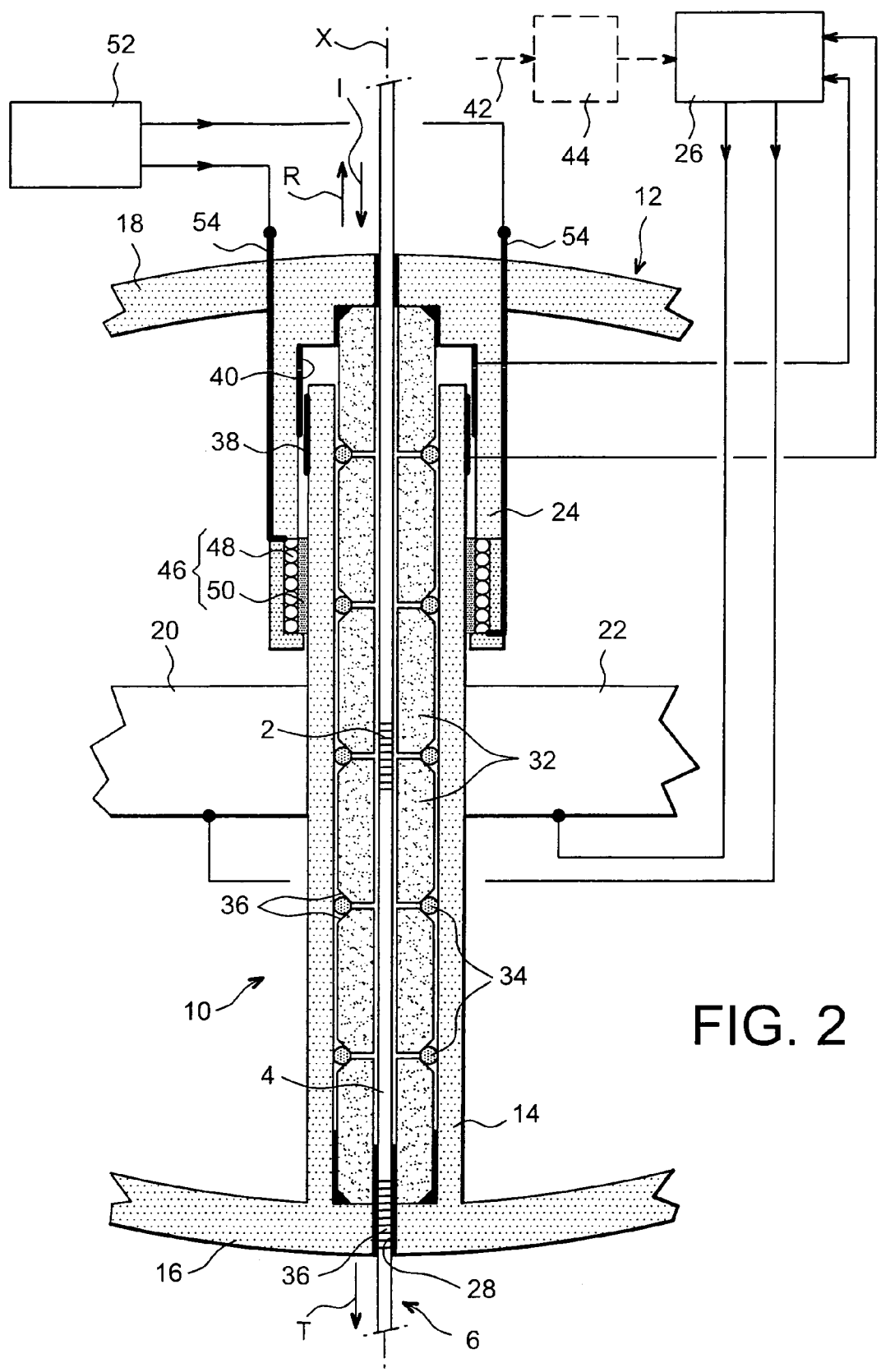
Figure 3:
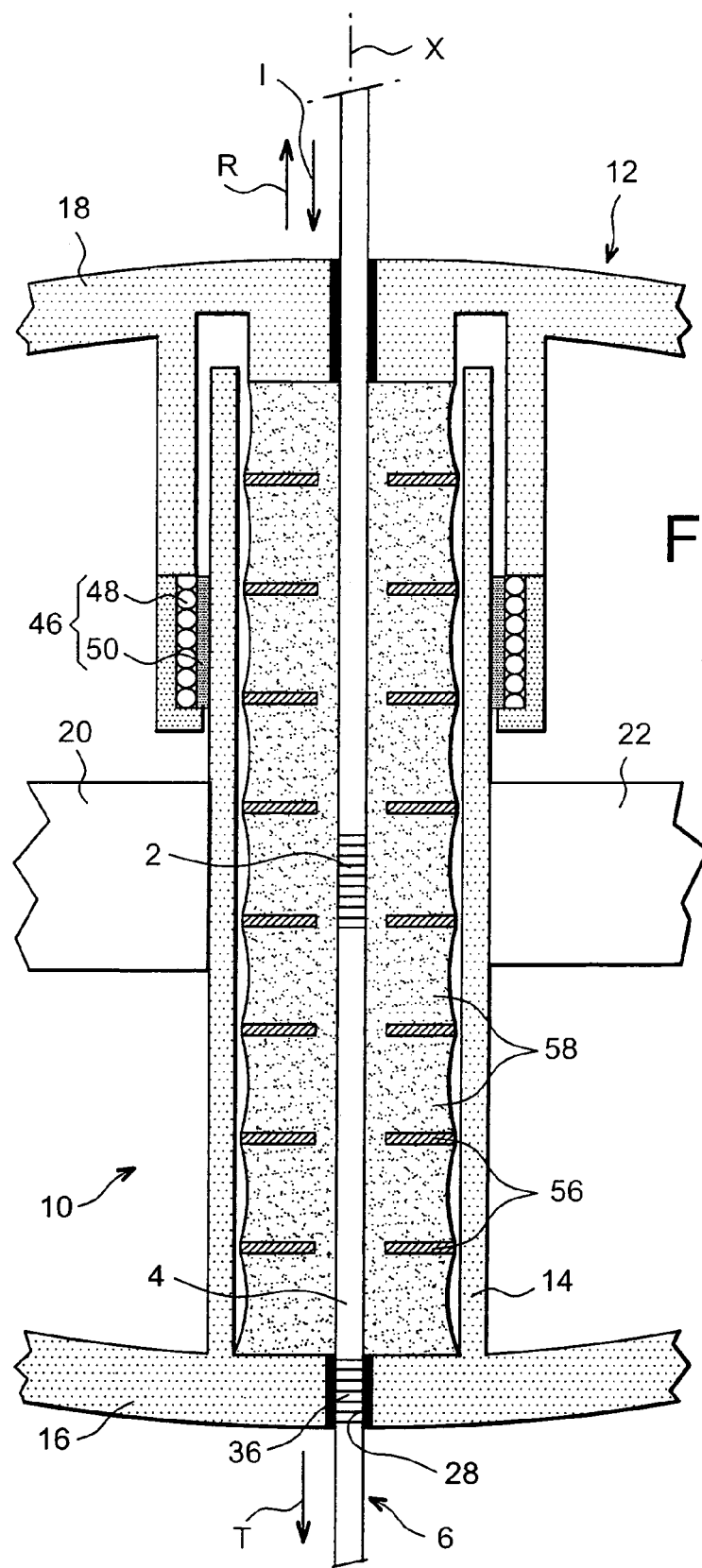

The present invention will be better understood upon reading the description of exemplary embodiments given hereafter, in a purely indicative and by no means limiting way, with reference to the appended drawings wherein:

FIG. 1 is a schematic view of a first particular embodiment of the device, object of the invention, FIG. 2 is a schematic and partial view of the device of FIG. 1, and FIG. 3 is a schematic and partial view of a second particular embodiment of the device, object of the invention.

DETAILED DISCUSSION OF PARTICULAR EMBODIMENTS

The device according to the invention, which is schematically illustrated in FIG. 1, is intended for tuning a Bragg grating 2 which is formed in a portion 4 of an optical fiber 6. To tune this grating, the device compresses the portion 4 of the optical fiber, which is rectilinear. The axis of this optical fiber portion, which is also the axis along which this portion is compressed, is marked as X.

The device of FIG. 1 comprises means 8 for compressing the optical fiber portion as well as means 10 provided for preventing buckling of this optical fiber portion when it is compressed longitudinally. These means 10 provided for preventing buckling are illustrated in more detail in FIG. 2.

In the example of FIG. 1, the means 8 for compressing this optical fiber portion are symmetrical relatively to axis X and comprise a deformable component 12, with a substantially elliptical shape, which is made out of a polymer material, for example.

In FIG. 1, a stiff tube 14 is also seen, the axis of which is axis X. An end of this tube 14 is attached to the internal wall of a part 16 of component 12 (lower part in FIG. 1).

The other end of the tube 14 faces the internal wall of the other part 18 of component 12 (upper part in FIG. 1) and is spaced apart from this part 18.

The compression means 8 also comprise a double piezoelectric actuator including two piezoelectric components 20 and 22, with an elongated shape, which are positioned in the space delimited by component 12. Moreover, in this space, components 20 and 22 extend perpendicularly to axis X.

In the example of FIG. 1, the tube 14 extends along the minor axis of the substantially elliptical component 12 whereas the piezoelectric components 20 and 22 extend along the major axis of this component 12.

Moreover, the piezoelectric component 20 is attached, on one side, to tube 14, and on the other side to component 12. Likewise, the piezoelectric component 22 is attached on one side, to tube 14 (opposite component 20) and on the other side to component 12.

A guiding tubular component 24, the axis of which is axis X, is also found in the space delimited by component 12 and this tubular component is attached to the internal wall of part 18 of this component 12.

The end of the tube 14, which is found facing this part 18, is placed in the tubular component 24 and is slightly spaced apart from it in order to be able to slide within this tubular component upon compression of the optical fiber portion, as it will be seen later on.

Means 26 for controlling the piezoelectric components 20 and 22 are seen in FIG. 2. When these components 20 and 22 are energized by these control means 26, components 20 and 22 extend perpendicularly to the X axis (arrows F1 and F2 in FIG. 1), component 12 is deformed, and tube 14 as well as the tubular component 24 move relatively to each other (arrows F3 and F4 of FIG. 1), which increases the overlapping of the end of the tube 14 with this tubular component 24.

It is specified that an end of the optical fiber portion 4 is attached to part 16 of the component 12 whereas the other end of this optical fiber portion is attached to the other part 18 of this component 12.

More specifically, it is seen that these parts 16 and 18 comprise bores 28 and 30 at the X axis, respectively. The optical fiber portion is attached in each of these bores. Deformation of component 12, which is mentioned earlier, thereby causes compression of the optical fiber portion.

If a light I emitted by a large bandwidth light source (not shown) is injected into the optical fiber 6, this light arrives on the Bragg grating 2. The latter reflects the light R with a wavelength which depends on the pitch of the grating. The optical fiber transmits the light T which is not reflected by this grating.

When the optical fiber portion 4 is compressed, the pitch of the grating is reduced and the wavelength of the reflected light R is changed.

In the example of FIGS. 1 and 2, the means 10 which prevent buckling of the optical fiber portion during its compression, comprise rings 32 and elastic components 34.

These components 34 are toric spacers which are made out of an elastic material with low friction coefficients, preferably honeycombed polytetrafluoroethylene.

The rings 32 are placed one after the other in tube 14. These rings encircle the optical fiber portion 4 and are spaced apart from one another by means of elastic toric spacers 34.

Each toric spacer 34 allows two adjacent rings 32 to be spaced apart by pressing on two chamfers 36, at 45°, formed on the ends of these rings, respectively, which are facing each other.

Thus, the optical fiber portion 4 is guided in all the rings, the latter being held longitudinally by the tube 14 which limits axial offset of these rings, for example to within ±0.5 µm.

With the small axial and especially longitudinal play which is evenly distributed among the rings by all the toric end pieces or gaskets 34, buckling of the optical fiber portion 4 may be avoided during its compression.

Moreover, the rings are self-aligned regardless of the longitudinal displacement imposed by the substantially elliptical component 12, due to the presence of the chamfers 36 at 45° pressing onto the toric gaskets 34 symmetrically.

It should be noted that the nearest ring to part 16 of this component 12 may be attached to this part 16 and the nearest ring to part 18 of the component 12 may be attached to this part 18, but this is not mandatory.

In a known way, a temperature-compensating Bragg grating 36 different from grating 2, may be provided in a portion of the optical fiber 6 which is not subject to compression, for example in the portion of this fiber which is found in the bore 28, where the optical fiber portion 4 is attached.

It should be noted that the deformation induced by the double piezoelectric actuator is amplified by the substantially elliptical component 12. An open loop configuration may be used for controlling this piezoelectric actuator.

However, a closed loop configuration is preferably used (FIG. 2). To do this, the longitudinal deformation of the piezoelectric components 20 and 22 may be measured by means of a variable capacitor, the plates of which 38 and 40 are coaxial.

One of these plates, with reference 38, results from metallizing the external wall of the end of tube 14 which is capable of sliding within the tubular component 24. The other plate 40 results from metallizing the internal wall of this component 24.

In this case, the tube 14 and the component 24 are electrical insulators, for example made out of a stiff plastic material.

The capacitance of the variable capacitor 38–40 is a linear function of the position of the end of the tube 14 relatively to the component 24 and therefore of the longitudinal deformation of the piezoelectric components 20 and 22.

The plates 38 and 40 are electrically connected to the control means 26 and provide the latter with the information relative to this longitudinal deformation.

As an alternative, in order to measure this longitudinal deformation, a portion 42 of the light R reflected by the Bragg grating 2 is recovered, for example via an optical coupler (not shown) which is inserted into the optical fiber 6, on the outside of the device of FIG. 1, and this light is processed by a suitable photo-detection interface 44 which then provides the control means 26 with the information relative to the longitudinal deformation.

Means 46 for immobilizing the device in any position, corresponding to a determined extension of the piezoelectric components 20 and 22 are further provided in the example of FIG. 2.

These means 46 comprise a ring or a spring 48 which is made out of a shape memory alloy. This ring or spring is attached to the end of the tubular component 24 on the side of the internal wall of the latter.

In the example of FIG. 2, the immobilizing means also comprise another ring 50 forming a braking ring, which is between the ring 48 and the end of tube 14.

As is seen in FIG. 2, the end of the tubular component 24 comprises a shoulder which supports the ring 48 and the braking ring 50.

Actuation of the blocking allowed by the ring 48 is performed by reducing the internal diameter of this ring at room temperature.

Expansion of the ring 48 which allows free movement of the tubular component 24 actuated by the piezoelectric components 20 and 22, occurs under the effect of a rise in temperature which is induced by the Joule effect, which causes the phase transition of the shape memory alloy.

In order to raise the temperature of the ring 48, the latter is connected to heating control means 52 (voltage source) via electrical connections 54.

The "trained" diameter reduction is reversible by returning to a state which is also "trained" corresponding to the other phase, i.e., the expanded phase, of the shape memory alloy.

The diameter reduction tightens the braking ring 50 which then locks the tubular component 24 on the tube 14.

In another example not requiring the training of both phases of the shape memory alloy, instead of the set of rings 48 and 50, the coupling of a shape memory alloy (SMA) associated with a cladding acting as a spring and made for example from a polymer, is used. With the different values of Young's modulus of the SMA in the martensitic and austenitic phases, the ring-spring, for which the product of Young's modulus by the section is intermediate to that of the SMA ring, may control the "expanded" or "closed" state of the blocking device.

In the example of FIG. 3, the means 10 for preventing the buckling of the optical fiber portion 4 comprise stiff washers 56 which are positioned in the tube 14, parallel to each other and perpendicularly to the X axis, and which encircle the optical fiber portion. These washers are spaced apart from each other by elastic components 58.

These elastic components 58 only form a single block which is made out of elastomeric material, confines the optical fiber portion 4 and extends from part 16 to part 18 of the component 12 as is shown in FIG. 3.

The stiff washers are slightly spaced apart from the internal wall of the tube 14.

When the fiber portion 4 is compressed, the washers move along the X axis, while being guided by the tube 14.

It is specified that the one-piece assembly of components 58 may be made by moulding and injecting an elastomer in a single part which integrates the optical fiber portion 4.

Moreover, the washers are machined with a precision of ±0.5 µm in order to limit axial offset. These washers are made integral with the elastomer by adhesion during the moulding; the same applies for the fiber portion.

In the example of FIG. 3, blocking means 46 may again be used and electrical connections and control means (not shown), mentioned in the description of FIG. 2, may be added to them.

A closed loop feedback control may also be used for the piezoelectric components 20 and 22 and the device may be provided with the coaxial capacitor (not shown) which was mentioned in the description of FIG. 2.

The invention claimed is:

1. A device for tuning a reflector component formed in a portion of an optical waveguide including first and second ends, the optical waveguide configured to propagate a light, the reflector component being capable of reflecting the light at a reflection wavelength, the device comprising:

means for compressing the optical waveguide portion and therefore the reflector component, to change a reflection wavelength; and prevention means for preventing buckling of the optical waveguide portion when the optical waveguide portion is compressed, wherein the prevention means comprises:

a tube with first and second ends, the tube being crossed by the optical waveguide portion, and means for guiding the portion in the tube;

wherein the means for compressing comprises:

a curved deformable component, with first and second sides, first respective ends of the tube and the optical waveguide portion being attached to the first side, a second end of the tube being spaced apart from the second side and the second end of the optical waveguide portion being attached to the second side, and a piezoelectric actuator, positioned in a space between the curved deformable component and the tube, and attached to the component and to the tube, the actuator configured to extend when energized and then deforming the component, the latter being then configured to compress the optical waveguide portion.

2. The device according to claim 1, wherein the reflector component is a Bragg grating.

3. The device according to claim 1, wherein the optical waveguide is an optical fiber.

4. The device according to claim 1, wherein the compression means has an axis of symmetry that is formed by the axis of an optical waveguide portion.

5. The device according to claim 1, wherein the guiding means comprises rings that extend one after the other in the tube, are spaced apart from one another by elastic components and/or elastic toric spacers, and crossed by the optical waveguide portion, the optical waveguide portion configured to freely slide in the rings.

6. The device according to claim 5, wherein the elastic components are in honeycombed polytetrafluoroethylene.

7. The device according to claim 1, wherein the guiding means comprises stiff washers placed one after the other in the tube, along the optical waveguide portion, and are crossed by the optical waveguide portion, and elastic components that extend one after the other in the tube, alternate with the stiff washers and are integral with the stiff washers.

8. The device according to claim 7, wherein the elastic components form a single block of elastic material that confines the optical waveguide portion.

9. The device according to claim 1, further comprising means for controlling the piezoelectric actuator in a closed loop configuration.

10. The device according to claim 9, wherein the control means comprises measuring means comprising the Bragg grating or a variable capacitor with two plates that are integral with the tube and the deformable component, respectively.

11. The device according to claim 1, further comprising means for blocking the deformable component.

12. The device according to claim 11, wherein the means for blocking comprises a component that is made out of a shape memory alloy and configured to tighten the tube.

* * * * *